SPHEROIDAL PLATINUM-GROUP CATALYSTS PRODUCTION

Filed Oct. 30, 1953

ALUMINA HYDROSOL PLUS DISSOLVED PLATINUM COMPOUND

INVENTORS:
George S. John
Alfred A. Brooks
BY

*Everet F. Smith*

ATTORNEY

United States Patent Office 2,805,206
Patented Sept. 3, 1957

2,805,206

SPHEROIDAL PLATINUM-GROUP CATALYSTS PRODUCTION

George S. John, Park Forest, and Alfred A. Brooks, Matteson, Ill., assignors to Standard Oil Company, Chicago, Ill., a corporation of Indiana Application October 30, 1953, Serial No. 389,368

3 Claims. (Cl. 252—448)

This invention relates to catalysts of the platinum-palladium group of metals for the conversion of hydrocarbons. More particularly, it relates to alumina-supported platinum-group catalysts in spheroidal form and to a method for the manufacture thereof.

The use of alumina-based platinum catalysts for the conversion of hydrocarbons has become strikingly successful within recent years, particularly in the field of hydroforming various types of petroleum naphthas to produce gasoline stocks of improved octane number. All of the commercial installations heretofore placed in operation have been units of the fixed-bed type, in which the catalyst was commonly employed in the form of molded pills, extruded pellets, broken fragments, or the like. Such catalysts are functionally acceptable, but have certain inherent shortcomings which render them less than ideal for this use—for example, they are mechanically non-uniform, they are subject to fragmentation of exposed edges, and they do not pack evenly, so that the resulting catalyst beds are subject to channelling. For use in fixed and moving beds, catalysts are much more satisfactory if prepared in the form of beads or spheres. It is accordingly an object of our invention to prepare an alumina-supported noble-metal catalyst in spheroidal form for use in the conversion of hydrocarbons, in particular for use in the so-called hydroforming process. A further object is to prepare such a catalyst in co-gelled form, having a uniform distribution of catalytic metal throughout the spheres, with consequent improvement in the catalytic properties thereof.

In our invention, an alumina hydrosol containing a platinum-group metal compound in solution is formed into globules of uniform size in an oil phase having certain characteristics to be defined hereinafter, and the globules are permitted to pass downward from the said oil phase into an aqueous alkaline phase having certain other characteristics. In the aqueous phase, the hydrosol globules set quickly to semirigid spheroidal particles of hydrogel. These particles are withdrawn from the aqueous phase and are slowly dried until free from excess moisture. The dried particles are calcined under conventional conditions, and are then ready for use in a catalytic process.

In carrying out our invention, we can satisfactorily employ alumina hydrosols prepared by any of the techniques described in the art. We prefer, however, to use an alumina hydrosol of the type described by Heard in Re. 22,196 (October 6, 1942), the said hydrosol being prepared by amalgamating metallic aluminum and reacting the amalgamated aluminum with dilute aqueous acetic acid at elevated temperature. A clear-to-opalescent hydrosol is obtained in this way which may contain from about 2 to 10 percent by weight of Al₂O₃, and ordinarily contains from about 3 to 5 percent of Al₂O₃. To the hydrosol we add a sufficient quantity of an aqueous solution of a platinum-group metal compound to incorporate between about 0.05 and 1 percent by weight of the said metal therein, based on dry Al₂O₃. Suitable compounds of the said class include chloroplatinic acid, fluoroplatinic acid, bromoplatinic acid, platinum tetrachloride, palladium chloride, iridium chloride, iridium iodide, iridium sulfate, osmium chloride, rhodium chloride, rhodium nitrate, ruthenium tetrachloride, and the like, and mixtures thereof, dissolved where necessary in an acid medium.

Other substances may be incorporated in the alumina hydrosol prior to treatment thereof according to our invention to produce catalysts of modified or promoted activity. Among such substances are chromia, vanadia, tungsten oxide, phosphorus oxides, boria, and the like, or materials affording such substances under the conditions employed. The catalyst modifiers or promoters are ordinarily added in a proportion between about 0.1 and 10 percent by weight of the active substance, based on dry Al₂O₃.

Our invention will be more readily understood by reference to the attached drawing, which illustrates in diagrammatic form a simple apparatus by means of which a platinum-alumina catalyst of our new type can be prepared. The apparatus includes a vessel 10 containing a two-phase treating bath consisting of an oily medium A as an upper phase 11 and an aqueous ammoniacal medium B as a lower phase 12. Platinum-containing hydrosol, prepared as described above, is introduced into vessel 10 by way of pipe 13, which terminates in an unconstricted orifice 14. The hydrosol issuing from the orifice forms drops 15 which become spheroidal as they pass downward through medium A. Medium A must be immiscible with medium B and with the alumina hydrosol, and must have a density lower than medium B and lower than the alumina hydrosol. The solubility of ammonia in medium A should not be sufficient to produce gelation of the hydrosol before the drops therein become spheroidal. The interfacial tension between medium A and the alumina hydrosol should be sufficiently large, and the viscous drag on the drops in medium A should be such, that the drops become spheroidal before reaching the interface 16 between medium A and medium B and are not deformed upon striking the said interface. Among the liquids that are satisfactory for use as medium A are hydrocarbons such as hexane, benzene, transformer oil, lubricating oil, singly or suitably admixed to adjust the viscosity, density, and interfacial tension. We prefer to use light hydrocarbons such as a petroleum naphtha boiling in the range of about 150 to 300° F. Non-hydrocarbons may also be used alone or in admixture with hydrocarbons or with each other, so long as the medium so obtained is immiscible with medium B and meets the other requirements set forth above. Among such materials are ethers, ketones, aldehydes, esters, alcohols, and halogenated hydrocarbons.

As a convenience in the practical adaptation of our invention, the relationship between the volume of the hydrosol drop, the orifice size, and the difference in density between the hydrosol and the oily upper phase (medium A) may be calculated from a formula developed by Harkins and Brown (J. Am. Chem. Soc., 41, 499 (1919)):

$$V = \frac{2\pi r \gamma}{g(d_2 - d_1)} \psi\left(\frac{2}{V^{1/3}}\right)$$

where $V$ is the volume of the hydrosol drop (cc.)

$r$ is the orifice radius (cm.)

$\gamma$ is the hydrosol-medium A interfacial tension (dynes/cm.)

$g$ is the acceleration due to gravity $d_2$ is the density of hydrosol (g./cc.)

$d_1$ is the density of medium A (g./cc.)

$\psi\left(\frac{2}{V^{1/3}}\right)$ is an empirical function correcting for drop shape as a function of $r$ and $V$ On the basis of this relationship, the volume of the hydrosol drop can be adjusted so as to give the desired dry bead size by proper choice of orifice size, hydrosol density, and oily phase density.

From medium A, the spheroids pass through interface 16 into gelling medium B, which is an alkaline liquid having a density greater than medium A but less than the spheroids. The interfacial tension between medium A and medium B should be less than about 25 dynes/centimeter, preferably less than 15 dynes/centimeter, and in any case should be sufficiently low for the spheroids to penetrate the interface readily and without serious deformation. Medium B may satisfactorily be a water solution of about 1 to 30 percent $NH_3$ by weight, to which has been added an appropriate quantity of an inert hydrophilic substance such as glycerol, ethylene glycol, ethylene glycol monomethyl ether, or the like for adjustment of the density, and/or a surface-active agent for adjustment of the surface and interfacial tensions. Suitable surface-active agents may be sodium isooctyl sulfate, sodium lauryl sulfate, sodium dodecylbenzenesulfonate, cetyltrimethylammonium chloride, or the like, or an oxygenated organic compound of low molecular weight, such as methanol, ethanol, acetone, or the like. Medium B may also or alternatively contain a sulfide or polysulfide of ammonium, a substituted ammonium, or other nitrogen base as a stabilizing and dispersing agent for the platinum and as the gelling agent. Such added sulfur (in the form of the active sulfur ion) may appropriately be used in equimolar ratio to the platinum or higher.

As one illustrative example, a medium B was prepared having a density of approximately 0.98 to 1.03 grams per cubic centimeter by addition of glycerol to concentrated (aqueous 30 percent) ammonia. The interfacial tension was then independently adjusted by adding a water-soluble, oil-insoluble surface-active agent of the class generally referred to as "ionic," specifically "Duponol ME Dry" (sodium lauryl sulfate), in a concentration between about 0.01 and 0.05 gram per liter. The characteristics of the aqueous ammonia were thereby modified so as to give a better penetration of the interface and less deformation of the falling drops.

The residence time of the spheroids in medium B is regulated so that they gel and become sufficiently rigid and strong to be handled mechanically or hydraulically without fracture. For this purpose, a residence time between about 3 and 20 minutes is ordinarily sufficient. The particles are then removed from medium B by mechanical or hydraulic means, and are washed if desired with water, acetone, alcohol, or other low-boiling solvent. They are then dried slowly at temperatures between about 50 and 300° F. until freed of excessive moisture, suitably until reduced to a total moisture content below about 100 percent by weight based on dry $Al_2O_3$ in a drying time of 12 to 72 hours. It is important that the entire surface of the spheroidal particles be dried uniformly to prevent deformation thereof. After the drying has reached the desired degree of completion, the particles are calcined to free them from volatile and oxidizable impurities at temperatures between about 700 and 1200° F. for about 1 to 24 hours, preferably between about 900 and 1150° F. for 3 to 12 hours. The spheres may finally be subjected to a treatment with hydrogen at a temperature within or around the usual hydroforming range of 850 to 1000° F. or the hydrogen treatment may be accomplished as a part of the hydroforming process itself.

The following is a further illustration of the preparation of a catalyst according to our invention. A Heard-type alumina hydrosol having a density of 1.05 grams per cubic centimeter, a surface tension of 75 dynes per centimeter, and an approximate $Al_2O_3$ content of 5 percent by weight is commingled with 0.8 gram of chloroplatinic acid per liter thereof in aqueous solution and the resulting mixture is introduced through a 7-millimeter orifice into the top of a 4-inch deep upper "dropping" layer of mixed hexanes and carbon tetrachloride (3:1 by volume) having a density of 0.90 gram per milliliter and a surface tension of 28 dynes per centimeter. An interfacial tension of 37.5 dynes per centimeter exists between the hydrosol and the dropping layer, and the hydrosol is heavier by 0.15 gram per cubic centimeter. Under these conditions, the hydrosol readily forms spherical globules, which descend from the dropping layer through an interface into a 24-inch deep gelation layer consisting of concentrated ammonium hydroxide (30 percent $NH_3$) which has been adjusted to a density of 1.00 gram per milliliter by addition of a sufficient quantity of glycerol, and to a surface tension of 40 dynes per centimeter by addition of 0.027 gram per liter of "Duponol ME Dry." Thus, the gelation layer is heavier than the dropping layer by 0.10 gram per milliliter, and the dropping and gelation layers exhibit an interfacial tension of 12 dynes per centimeter. Within the latter layer, the hydrosol globules rapidly gel as uniform spheres and become firm enough for further handling after 15 to 20 minutes. Thereafter, they are withdrawn, washed thoroughly with water, dried at 200° F. for 24 hours, and calcined at 1100° F. for 6 hours. The completed spheres are hard, durable, porous beads of substantially uniform diameter around one centimeter.

Our invention will be more fully understood from the following specific examples.

Example 1

An alumina-based catalyst containing 0.54 percent by weight of platinum and 0.40 percent by weight of chloride was prepared by cogelling chloroplatinic acid and a Heard-type alumina hydrosol according to the following procedure, embodying our new technique:

The required platinum-alumina mixture was prepared by commingling 20 milliliters of aqueous chloroplatinic acid solution equivalent to 0.790 gram of Pt with 3 liters of Heard-type alumina hydrosol containing 4.87 percent by weight of $Al_2O_3$. The mixture was dropped from a 7-millimeter orifice through a 4-inch layer of hexane into a 24-inch gelation layer consisting of 125 milliliters of aqueous 30 percent ammonium hydroxide, 125 milliliters of water, and 0.02 gram of sodium lauryl sulfate, where the globules were allowed to gel and age at ordinary temperatures for 20 minutes. The resulting spheres were drained, washed thoroughly with distilled water, dried slowly in air at 70° F. for 48 hours, and calcined at 1100° F. for 6 hours. The calcined spheres had a crushing strength of 35 to 40 pounds.

The completed catalyst was tested in a hydroforming reaction, employing a quasi-isothermal reaction tube surrounded by an electrically heated metal block for temperature control. The charging stock was a Mid-Continent virgin naphtha having an ASTM boiling range of 200–360° F., a CFR–R octane number of 44, a sulfur content of 0.03 percent, an API gravity of 56.5, a Reid vapor pressure of 1.8 pounds per square inch, a bromine number of 1.4, and a composition of 40 percent naphthenes, 52 percent paraffins, and 8 percent aromatics. The tests were carried out at a block temperature of about 960° F., a reactor pressure of 200 pounds per square inch gage, an hourly weight space velocity around 2, and a once-through hydrogen rate around 5000 cubic feet per barrel of feed. The products were collected and analyzed with the following results:

| Product Interval, hr. | Catalyst Temp. | | Octane No., CFR–R | Yield, vol. percent | Selectivity, percent |
| --- | --- | --- | --- | --- | --- |
| | Inlet, °F. | Outlet, °F. | | | |
| 0–20 | 932 | 921 | 96.6 | 82.7 | 102.5 |
| 20–40 | 930 | 920 | 94.9 | | |
| 40–60 | 930 | 920 | 94.7 | 83.9 | 101.4 |

Example 2

Another cogelled platinum-alumina catalyst was prepared according to the general procedure described in Example 1, employing a mixture of 20 milliliters of aqueous chloroplatinic acid solution equivalent to 0.795 gram of Pt and 3 liters of Heard-type alumina hydrosol containing 4.86 percent by weight of $Al_2O_3$. The treating bath was a 4-inch upper layer of hexane and a 24-inch lower layer consisting of 125 milliliters of aqueous 30 percent ammonium hydroxide, 125 milliliters of water, 5 milliliters of aqueous 22.2 percent ammonium sulfide, and 0.02 gram of sodium lauryl sulfate. The platinum-alumina mixture was dropped from a 7-millimeter orifice through the upper layer into the lower layer, where the resulting spherical globules were allowed to gel and age at ordinary temperatures for 20 minutes. Thereafter, the spheres were drained, washed thoroughly with distilled water, dried slowly in air at 70° F. for 48 hours, and calcined at 1100° F. for 6 hours. The completed catalyst contained 0.57 percent by weight of platinum and 0.40 percent by weight of chloride and had a crushing strength of 35 to 40 pounds. When it was subjected to a hydroforming test as described in Example 1, it gave the following results:

| Product Interval, hr. | Catalyst Temp. Inlet, °F. | Catalyst Temp. Outlet, °F. | Octane No., CFR-R | Yield, vol. percent | Selectivity, percent |
|---|---|---|---|---|---|
| 0–20 | 923 | 937 | 99.4 | | |
| 20–40 | 921 | 936 | 99.3 | | |
| 40–60 | 921 | 936 | 98.0 | 83.9 | 103.2 |
| 60–80 | 935 | 940 | 98.8 | 84.4 | 106.1 |
| 80–100 | 938 | 941 | 98.5 | | |
| 100–120 | 939 | 941 | 98.4 | | |
| 120–140 | 939 | 941 | 98.3 | | |
| 140–150 | 939 | 942 | 98.1 | | |

Our new catalyst is broadly useful in hydrocarbon-conversion reactions which are catalyzed by platinum, palladium, and related metals, and which require or can advantageously employ a spheroidal catalyst of high mechanical strength and resistance to abrasion. Specifically, our catalyst is useful in fixed-bed and moving-bed processes for reforming, isomerizing, hydrogenating, hydrocracking, dehydrogenating, oxidizing, polymerizing, condensing, and otherwise converting hydrocarbons and other organic compounds. The required processing conditions depend upon the specific reactions and the charging stocks involved, and may readily be determined from the teachings of the prior art. In general, with respect to the particular reactions involved, our improved catalyst is suitable under substantially the same conditions as required for conventional platinum-alumina catalysts.

While we have described our invention with reference to certain specific embodiments thereof, it should be understood that such embodiments are illustrative only and not by way of limitation. Various modifications of our invention and alternative charging stocks, manipulative steps, and operating conditions will be apparent from the foregoing description to those skilled in the art.

In accordance with the foregoing description, we claim as our invention:

1. A method of preparing spherical beads of cogelled platinum-alumina catalyst which comprises commingling an alumina hydrosol containing between about 3 and 5 percent by weight of $Al_2O_3$ with an aqueous solution of chloroplatinic acid in a quantity equivalent to between about 0.05 and 1 percent by weight of platinum, based on dry $Al_2O_3$ contained in said hydrosol, introducing the resulting mixture, without substantial change in the viscosity thereof, into the upper phase of a two-phase treating bath consisting of an upper organic phase and a lower aqueous phase, said upper phase consisting essentially of a mixture of hexanes and carbon tetrachloride having a density of about 0.90 gram per milliliter, said aqueous phase being a mixture of concentrated ammonium hydroxide and glycerol having a density of about 1 gram per milliliter and having added thereto between about 0.01 and 0.05 gram per liter of sodium lauryl sulfate, said phases having an interfacial tension below about 15 dynes per centimeter, whereby said mixture of alumina hydrosol and chloroplatinic acid forms spherical globules in said hydrocarbon phase which fall without permanent deformation into said aqueous phase and are caused to gel therein in the form of spheres, aging said spheres in said aqueous phase for a period of around 3 to 20 minutes, removing said spheres from said aqueous phase, uniformly drying said spheres at a temperature between about 50 and 300° F. for a period of around 12 to 72 hours to a water content below about 100 percent by weight based on dry $Al_2O_3$, and calcining the dried spheres at a temperature between about 900 and 1150° F. for 3 to 12 hours.

2. A method of preparing spherical beads of cogelled platinum-alumina catalyst which comprises commingling an alumina hydrosol containing between about 2 and 10 percent by weight of $Al_2O_3$ with an aqueous solution of chloroplatinic acid in a quantity equivalent to between about 0.05 and 1 percent by weight of platinum, based on dry $Al_2O_3$ contained in said hydrosol, introducing the resulting mixture without substantial change in the viscosity thereof into the upper phase of a two-phase treating bath consisting of an upper organic phase and a lower aqueous phase, said upper organic phase being hexane, said lower aqueous phase being a mixture of aqueous 30 percent ammonium hydroxide and about an equal volume of water, and having added thereto about 0.08 gram per liter of sodium lauryl sulfate, said phases having an interfacial tension below about 25 dynes per centimeter, whereby said mixture of alumina hydrosol and chloroplatinic acid forms spherical globules in said hydrocarbon phase which fall without permanent deformation into said aqueous phase and are caused to gel therein in the form of spheres, aging said spheres in said aqueous phase for a period of about 20 minutes, removing said spheres from said aqueous phase, uniformly drying said spheres at a temperature of about 70° F. for a period of around 48 hours to a water content below about 100 percent by weight based on dry $Al_2O_3$, and calcining the dried spheres at a temperature of about 1100° F. for about 6 hours.

3. The method of claim 2 wherein said lower aqueous phase also contains aqueous 22 percent ammonium sulfide in a concentration of about 2 volume percent.

References Cited in the file of this patent

UNITED STATES PATENTS

| | | |
|---|---|---|
| 2,456,633 | Haensel | Dec. 21, 1948 |
| 2,457,970 | Bailie | Jan. 4, 1949 |
| 2,492,808 | Marisic et al. | Dec. 27, 1949 |
| 2,532,497 | Hoekstra | Dec. 5, 1950 |
| 2,713,037 | Kimberlin | July 12, 1955 |